United States Patent [19]
Rao et al.

[11] Patent Number: 5,757,525
[45] Date of Patent: May 26, 1998

[54] ALL-OPTICAL DEVICES

[75] Inventors: Devulapalli V. G. L. N. Rao, Lexington; Francisco J. Aranda, Arlington, both of Mass.; Desai Narayana Rao, Hyderabad, India; Joseph A. Akkara, Holliston; Joseph F. Roach, West Roxbury, both of Mass.; Zhongping Chen, Irvine, Calif.

[73] Assignee: University of Massachusetts, Boston, Mass.

[21] Appl. No.: 658,536

[22] Filed: Jun. 5, 1996

[51] Int. Cl.$^6$ .................. G02F 3/00; G02F 1/03
[52] U.S. Cl. .................. 359/108; 359/241; 359/244
[58] Field of Search .................. 359/108, 241, 359/243, 244

[56] References Cited

U.S. PATENT DOCUMENTS

| | | |
|---|---|---|
| 4,471,470 | 9/1984 | Swainson et al. |
| 4,801,670 | 1/1989 | DeMartino et al. ........ 350/536 X |
| 4,930,873 | 6/1990 | Hunter ........ 350/354 |
| 5,228,001 | 7/1993 | Birge et al. |
| 5,253,198 | 10/1993 | Birge et al. |
| 5,290,699 | 3/1994 | Oesterhelt et al. |
| 5,502,585 | 3/1996 | Qian ........ 359/108 |

OTHER PUBLICATIONS

Aranda et al., "Nonlinear Optical Interactions in Bacteriorhodopsin Using Z–Scan," *Optical Review*, 2:(3)204–206, 1995.
Aranda et al., "All–optical light modulation in bacteriorhodopsin films," *Appl. Phys. Lett.*, 67:(5)599–601, 1995.
Birge et al., "Nonlinear Optical Properties of Bacteriorhodopsin: Assignment of the Third–order Polarizability Based on Two–Photon Absorption Spectroscopy," *SPIE Biomolecular Spectroscopy II*, 1432:129–140, 1991.
Birge, "Protein–Based Optical Computing and Memories," *Computer*, 1100:56–67, Nov. 1992.
Birge, "Protein–Based Computers," *Scientific American*, pp. 90–95, Mar 1995.
Chen et al., "Bacteriorhodopsin oriented in polyvinyl alcohol films as an erasable optical storage medium," *Applied Optics*, 30:(35)5188–5196, 1991.
Glückstad et al., "Spontaneous pattern formation in a thin film of bacteriorhodopsin with mixed absorptive–dispersive nonlinearity," *Optic Letters*, 20:(6)551–553, 1995.
Hampp et al., "Mutated Bacteriorhodopsins: Comptetive Materials for Optical Information Processing?", *MRS Bulletin*, 17:(11)56–60, 1992.
Haronian et al., "Microfabricating bacteriorhodopsin films for imaging and computing," *Appl. Phys. Lett.*, 61:(18)2237–2239, 1992.
Hendrickx et al., "The Bacteriorhodopsin Chromophore Retinal and Derivatives: An Experimental and Theoretical Investigation of the Second–Order Optical Properties," *J. Am. Chem. Soc.*, 117:3547–3555, 1995.
Hong, "The Bacteriorhodopsin Model Membrane System as a Prototype Molecular Computing Element," *BioSystems*, 19:223–236, 1986.
Kirkby et al., "Optical Nonlinearity and Resonant Bistability in Organic Photochromic Thin Films," *Optical Bistability III*, Proceedings of the Topical Meeting, Tucson, AZ, Springer–Verlag, 1985.

(List continued on next page.)

*Primary Examiner*—Mark Hellner
*Attorney, Agent, or Firm*—Fish & Richardson P.C.

[57] ABSTRACT

All-optical devices, e.g., optical switches and modulators, and logic gates such as optical AND and OR gates, that include photochromic materials having first and second stable states, such as bacteriorhodopsin, organic fulgides, azo and fluorescent dyes, phycobiliproteins, rhodopsins, and their analogs, irradiated in a four-wave mixing geometry, are described. These devices can be used in a wide variety of systems, such as, e.g., optical signal processors and optical computers.

41 Claims, 5 Drawing Sheets

OTHER PUBLICATIONS

Korchemskaya et al., "Spatial polarization wavefront reversal under conditions of four-wave mixing in biochrome films," *Sov. J. Quantum Electron.*, 17:(4)450–454, 1987.

Korchemskaya et al., "Photoinduced anisotropy, four-wave mixing and phase conjugation in materials based on bacteriorhodopsin," *SPIE High-Speed Phenomena in Photonic Materials and Optical Bistability*, 1280:308–313, 1990.

Nesset et al., "All-optical and gate operating on 10Gbit/s signals at the same wavelength using four-wave mixing in a semiconductor laser amplifier," *Electronics Letters*, 31:(11)896–897, 1995.

Oesterhelt et al., "Bacteriorhodopsin: a biological material for information processing," *Quart. Review of Biophysics*, 24:(4)425–478, 1991.

Rao et al., "Mirrorless all-optical bistability in bacteriorhodopsin," *Appl. Phys. Lett.* 63:(11)1489–1491, 1993.

Song et al., "Optical limiting by chemically enhanced bacteriorhodopsin films," *Optics Letters*, 18:(10)775–777, 1993.

Taranenko et al., "Optical bistability and signed competition in active cavity with photochromic non–linearity of bacteriorhodopsin," *SPIE Optical Memory and Neural Networks*, 1621:169–179, 1991.

Thoma et al., "Bacteriorhodopsin films as spatial light modulators for nonlinear–optical filtering," *Optics Letters*, 16:(9)651–653, 1991.

Thoma et al., "Real-time holographic correlation of two video signals by using bacteriorhodopsin films," *Optics Letters*, 17:(16)(1158–1160, 1992.

Vsevolodov et al., "Actual Possibilities of Bacteriorhodopsin Application in Optoelectronics," Institute of Biological Physics, USSR Academy of Sciences, pp. 381–384, [year?].

Werner et al., "Saturable absorption, wave mixing, and phase conjugation with bacteriorhodopsin," *Optics Letters*, 15:(20)1117–1119, 1990.

Werner et al., "Strong self–defocusing effect and four-wave mixing in bacteriorhodopsin films," *Optics Letters*, 17:(4)241–243, 1992.

ALL-OPTICAL DEVICES

This invention was made with Government support under BAA Contract No. DAAK 60-92-K-002. The government may have certain rights in this invention.

BACKGROUND

This invention relates to all-optical devices featuring photochromic materials such as rhodopsin, e.g., bacteriorhodopsin and bacteriorhodopsin analogs.

Photochromic materials are capable of changing color upon exposure to radiant energy such as light. One such material is rhodopsin, or "visual purple," a photosensitive, red protein pigment in the retinal rods of marine fishes and most higher vertebrates, e.g., octopus, mollusks, and man. A protein related both in structure and function to rhodopsin is the halobacterial retinal-containing protein bacteriorhodopsin (bR), which is a light-absorbing protein synthesized by the bacteria *Halobacterium halobium*. The chromophore is a retinal moiety linked via a protonated Schiff base near the middle of helix G to lysine-216.

In its natural state the bR molecules perform the biological function in the halobacterial cell of converting light into an electrochemical ion gradient across the membrane, i.e., it pumps cytoplasmic protons across the membrane to the outside of the cell, to synthesize ATP from inorganic phosphate and ADP. When irradiated, individual bR molecules undergo light-induced structural changes that result in large changes in optical properties as the molecule passes through different states in a so-called "photocycle." The bR photocycle is shown schematically in FIG. 1.

In the initial B state of bR, also called the "light adapted" state, the retinal chromophore is in an all-trans molecular configuration. The B state has an absorption maximum at 570 nm, with a broad absorption band of +/−100 nm, that allows bR to be excited by means of light in the red, yellow, or green portions of the optical spectrum. Once a photon is absorbed, the retinal chromophore undergoes configurational and conformational changes, the first of which is in a sub-picosecond time frame. The chromophore subsequently goes through a series of short-lived intermediates to the so-called M state, which has an absorption maximum at 410 nm wavelength.

The M state can revert to the initial B state via thermal relaxation processes or by photochemical processes upon excitation with blue light (410 +/−50 nm). The thermal relaxation of the chromophore from the M state is initiated by the reprotonation of the aspartic acid in position 96 (Asp-96 residue). The retinal molecule is then able to isomerize once again and relax to the all-trans B state. The lifetime of the M state depends on the kinetics of the reprotonation process, and can be altered by different means such as the extent of drying, controlling pH, changing the temperature, and by genetic mutation. For example, Chen et al. (Appl. Opt., 30, 5188, 1991) describes high pH bR films in which the M state lifetime is increased from milliseconds to tens of seconds. The time required to switch between the M and B states via a photochemical process is much faster than the states' lifetime, and is typically on the order of nanoseconds.

Because of the short lifetimes of the other intermediate states, the bR photocycle can be approximated by a two-state model that includes only the B and M states.

Of the rhodopsins, bR is the most mechanically robust (it can be stored for years without degrading) and, unlike many biological materials, bR is not adversely affected by environmental perturbations such as heat, light, and humidity. In fact, bR is stable at temperatures of up to about 140° C., is stable with respect to photodegradation, and can be exposed to light for long periods of time without sacrificing optical performance. For example, no noticeable change is observed after a bR film is switched between the B and M states more than a million times with a quartz lamp with appropriate color filters.

In addition to its stability, bR has many desirable optical properties. Bacteriorhodopsin has a high optical absorption cross-section for both B and M states and undergoes optical saturation at very low intensities. Bacteriorhodopsin additionally has a fast switching time, and can switch between M and B states in a matter of nanoseconds. Due to its optical properties, bR has been proposed as a material with applications in photonics technology, e.g., in information processing (Chen et al., Applied Optics, 30, 5188 (1991); Hampp et al., Physics Today, 41, 38 (1988); Korchemskaya et al., Sov. Journal of Quantum Electronics, 17, 450 (1987)), and in computer memories (Birge et al., Scientific American, p. 90 (March, 1995)).

SUMMARY

The invention is based on the discovery that photochromic materials can be used under specific conditions to operate as all-optical devices, e.g., optical switches and modulators, and logic gates such as optical AND and OR gates, when irradiated in a four-wave mixing geometry. These devices can be used in a wide variety of systems, such as, e.g., optical signal processors and optical computers.

In general, in one aspect, the invention features an all-optical modulator including a photochromic material, a radiation source, a modulating radiation source, and a radiation detector.

The photochromic material has first and second stable states, and can be an organic photochromic fulgide, cytochrome C, an azo dye, a carbazole compound with a conjugated side chain and/or electron withdrawing groups, a phycobiliprotein, a fluorescent dye, a rhodopsin, bacteriorhodopsin, or an analog thereof. Preferably, the photochromic material is bacteriorhodopsin or a bacteriorhodopsin analog. The first stable state can be a B state, and the second stable state can be an M state.

The radiation source generates three input radiation fields configured to spatially overlap within the photochromic material, e.g., in a specific region of the material. Each input radiation field is set at a wavelength and intensity to maintain the photochromic material in the second stable state. The input radiation fields can be set at a wavelength of 480 to 770 nm, preferably 620 to 640 nm. The input radiation fields can be beams generated by a first laser. The three input radiation fields can include first and second input radiation fields and a probe input radiation field. The first and second input radiation fields can be configured to strike opposite sides of the photochromic materials in a backward degenerate four-wave mixing geometry or a boxcar four-wave mixing geometry.

The modulating radiation source generates a modulating radiation field configured to strike the photochromic material, and is set at a wavelength and intensity to convert the photochromic material to the first stable state. The modulating radiation field can be set at a wavelength of 300 to 480 nm, preferably 450 to 470 nm. The modulating radiation field can be a beam generated by a second laser. When the modulating radiation field carries a constant signal, either on or off, the modulator operates as an all-optical switch. When the modulating radiation field carries a modulating signal, the output radiation field is modulated according to the modulating signal. For example, the modulating signal can be a video signal.

The radiation detector is arranged to detect an output radiation field. The output field is generated only when the modulating radiation field converts the photochromic material to the first stable state, which enables the three input radiation fields to produce a periodic intensity grating in the photochromic material, thereby generating the output radiation field which is phase-matched with the three input radiation fields. The output radiation field can counter-propagate along the same optical path as the probe field.

In another aspect, the invention features an all-optical logic gate including a photochromic material as described herein, a first radiation source, a second radiation source, and a radiation detector.

The first radiation source generates a first logic gate input at a first wavelength that is split into a set of three input radiation fields configured to spatially overlap within the photochromic material, or within a region of the material. The second radiation source generates a second logic gate input at a second wavelength that is split into a set of three input radiation fields configured to spatially overlap within the photochromic material with each other and with the set of input radiation fields of the first logic gate input. The two sets of three input radiation fields can include first and second input radiation fields and a probe input radiation field. The first and second input radiation fields can be configured to strike opposite sides of the photochromic materials in a backward degenerate four-wave mixing geometry or a boxcar four-wave mixing geometry. The first logic gate input can be set at a wavelength of 480 to 770 nm, preferably 620 to 640 nm. The second logic gate input can be set at a wavelength of 300 to 480 nm, preferably 450 to 470 nm. The first logic gate input can be a field generated by a first laser. The second logic gate input can be a field generated by a second laser.

The radiation detector is arranged to detect a logic gate output radiation field bearing both first and second wavelengths. The logic gate output is generated only when the two sets of radiation fields of both logic gate inputs each produce a periodic intensity grating in the photochromic material, thereby generating the output radiation field which is phase-matched with the two sets of radiation fields of both logic gate inputs. The logic gate output radiation field can counter-propagate along the same optical path as the two probe fields.

In the all-optical logic gate, a saturation intensity level of the photochromic material, and intensity levels of the logic gate inputs, can be selected such that the photochromic material is above the saturation intensity level when either of the two logic gate inputs are on, and is below the saturation intensity level when both logic gate inputs are on simultaneously, thereby enabling the two sets of radiation fields of both logic gate inputs to each produce a periodic intensity grating in the photochromic material and generate the output radiation field only when both logic gate inputs are on. In this configuration, the logic gate operates as an AND gate. The photochromic material can include bacteriorhodopsin and have a saturation intensity level of between 0.1 and 100 mW/cm$^2$ (preferably 1.0 to 2.0 mW/cm$^2$) at wavelengths of 300 to 770 nm. The first logic gate input can have a wavelength of 480 to 770 nm (preferably 620 to 640 nm) and an intensity of 1 to 500 mW/cm$^2$. The second logic gate input can have a wavelength of 300 to 480 nm (preferably 450 to 470 nm) and an intensity of 1 to 500 mW/cm$^2$. In this configuration, the two input intensities are always greater than the saturation intensity level.

Alternatively, in the all-optical logic gate, a saturation intensity level of the photochromic material, and intensity levels of the logic gate inputs, can be selected such that the photochromic material is below the saturation level when either of the two logic gate inputs are on individually, and when both logic gate inputs are on simultaneously, thereby enabling the two sets of radiation fields of both logic gate inputs to each produce a periodic intensity grating in the photochromic material and generate the output radiation field when either or both logic gate inputs are on. In this configuration, the logic gate operates as an OR gate. The photochromic material can include bacteriorhodopsin and have a saturation intensity level of 10 to 1000 mW/cm$^2$ (preferably 150 to 250 mW/cm$^2$ at 632 nm). The first logic gate input can have a wavelength of 470 to 770 nm and an intensity of 0.1 to 150 (preferably 1.0 to 25) mW/cm$^2$, and the second logic gate input can have a wavelength of 300 to 480 nm and an intensity of 0.1 to 150 (preferably 1.0 to 25) mW/cm$^2$, with the same preferred wavelengths described above. In this configuration, the two input intensities are lower than the saturation intensity level.

In another aspect, the invention features a method for modulating an optical input, e.g., a laser beam, to provide a modulated optical output. First, a photochromic material having first and second stable states is irradiated with the optical input, which is split into three input radiation fields configured to spatially overlap within the photochromic material. Each input radiation field is set at a wavelength and intensity to maintain the photochromic material in the second stable state. Second, the photochromic material is irradiated with a modulating radiation field. The modulating radiation field is configured to strike the photochromic material in the same region as the input radiation fields, and is set at a wavelength and intensity to convert the photochromic material to the first stable state. Third, the modulated optical output is detected. The output is generated only when the modulating radiation field converts the photochromic material to the first stable state, which enables the three input radiation fields to produce a periodic intensity grating in the photochromic material, thereby generating the modulated output which is phase-matched with the three input radiation fields.

The three input radiation fields can include first and second input radiation fields and a probe input radiation field. The modulated output can counter-propagate along the same optical path as the probe field. The photochromic material can be bacteriorhodopsin or a bacteriorhodopsin analog. When the modulating radiation field carries a constant signal, either on or off, the device operates as an all-optical switch. When the modulating radiation field carries a modulating signal, the output field or signal is modulated according to the modulating signal.

In another aspect, the invention features a method of generating an all-optical logic gate output. First, a photochromic material having first and second stable states is irradiated with a first logic gate input at a first wavelength. The first gate input is split into a set of three input radiation fields configured to spatially overlap within the photochromic material. Second, the photochromic material is irradiated with a second logic gate input at a second wavelength. The second gate input is split into a set of three input radiation fields configured to spatially overlap within the photochromic material with each other. Third, the set of input radiation fields of the second logic gate input are spatially overlapped with the set of input radiation fields of the first logic gate input within the photochromic material, or a region of the material. A logic gate output bearing both first and second wavelengths is generated only when the two sets of radiation fields of both logic gate inputs each produce a periodic intensity grating in the photochromic material, thereby generating the output which is phase-matched with the two sets of radiation fields of both logic gate inputs.

The two sets of three input radiation fields each can include first and second input radiation fields and a probe input radiation field. The logic gate output can counter-propagate along the same optical path as the two probe fields. The photochromic material can be bacteriorhodopsin or a bacteriorhodopsin analog.

In this method, a saturation intensity level of the photochromic material, and intensity levels of the logic gate inputs, can be selected such that all-optical logic gate output is that of an AND gate or an OR gate.

As used herein, a "photochromic material" is any optically sensitive material that changes color (and "state") upon exposure to radiation, and has at least two states depending on the type of radiation to which the material is exposed. The stability of each state can vary by several orders of magnitude. Most preferably, each state is stable for between one minute and a few seconds.

As used herein, an "analog" of a photochromic material is a variant of the naturally occurring photochromic material that has at least one altered characteristic, but maintains at least two stable states, though these states may be altered in their lifetimes or in their absorption bands compared to the naturally occurring material.

Thus, a "bacteriorhodopsin analog" is any form of bR that is different from the naturally occurring, wild-type form, but that still has at least two stable states that depend upon the type or wavelength of radiation to which it is exposed. Examples of bR analogs include mutant forms in which one or more amino acids are altered or exchanged, e.g., by genetic engineering techniques, and chemically altered forms, in which the bR chromophore retinal is replaced with an altered or different chromophore, e.g., an azulene derivative of retinal. Bacteriorhodopsin analogs have different absorption spectra and/or lifetimes of particular states, e.g., the M state, than wild-type bR.

Unless otherwise defined, all technical and scientific terms used herein have the same meaning as those commonly understood by one of ordinary skill in the art to which this invention belongs. Although methods and materials similar or equivalent to those described herein can be used in the practice or testing of the present invention, the preferred methods and materials are described below. All publications, patent applications, patents, and other references mentioned herein are incorporated herein by reference in their entirety. In case of conflict, the present application, including definitions, will control. In addition, the materials, methods, and examples are illustrative only and not intended to be limiting.

The all-optical devices provide a number of advantages. In general, optical switching using photochromic materials, e.g., bR, is advantageous compared to corresponding electronic switching techniques, as it allows data to be processed at high speeds and with a high bandwidth. Moreover, unlike electrical signals, optical signals generated by the devices are not susceptible to distortion and cross-talk from electronic sources (e.g., power lines, neighboring electric wires), and can therefore be transported long distances while maintaining high fidelity.

Further, a bottleneck in modern computers is the transfer of data within the computer, which can limit their performance. This problem can be greatly alleviated through the use of the present all-optical devices that employ highly efficient protein-based switches that allow the implementation of storage, transfer, and manipulation of massive amounts of data by parallel processing at very low energies and high speeds.

Finally the cost of producing the all-optical devices is low, they have very low power requirements, and they are environmentally friendly to manufacture.

These and other advantages will be apparent from the following detailed description, and from the claims.

DETAILED DESCRIPTION

Figure 1:
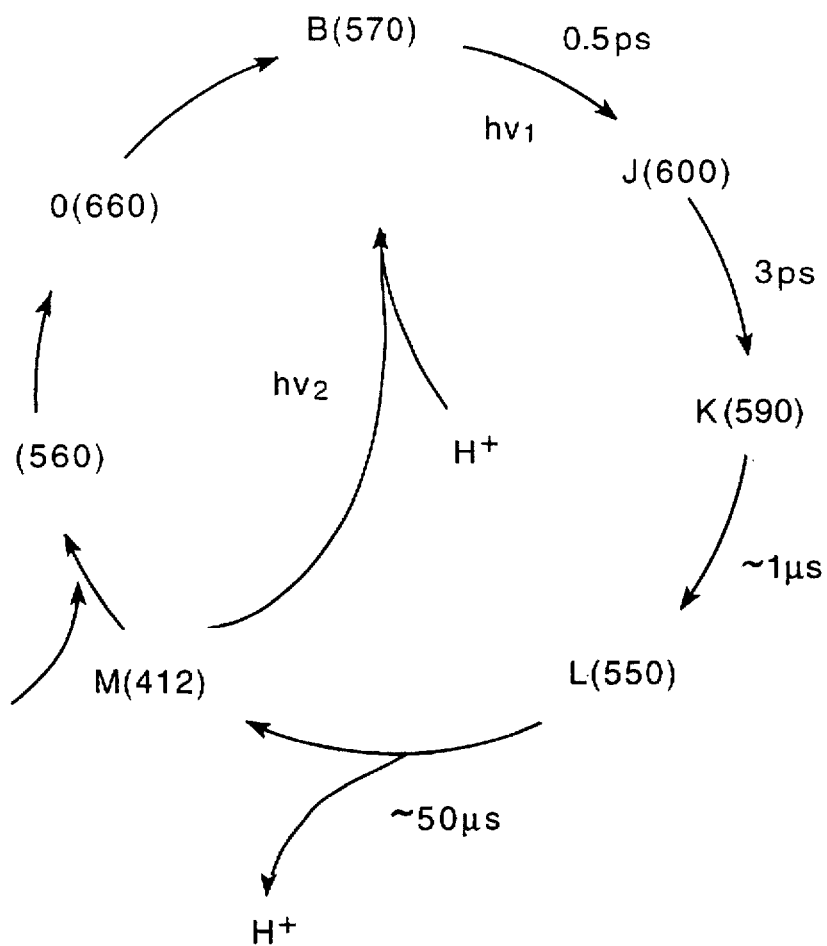
FIG. 1 is a schematic diagram of the bR photocycle.

The invention is based on the discovery that photochromic materials such as bacteriorhodopsin or organic photochromic fulgides, can be used under specific conditions to operate in an all-optical device. e.g., as an optical switch or modulator, or as optical logic gates, e.g., optical AND or OR gates, when irradiated in a four-wave mixing geometry.

All-Optical Devices

All of the devices described herein have certain materials and principles in common. First, each device contains a photochromic material that has at least two stable states depending on the type of radiation to which it is exposed. Second, each device includes three input optical fields and one output field in a four-wave mixing geometry. The three input fields generate a fourth optical field that provides an output signal satisfying the phase matching condition, e.g., a phase-conjugate field.

Photochromic Materials

Photochromic materials include organic photochromic fulgides, cytochrome C, azo dyes such as naphthol red and yellow, carbazole compounds with a conjugated side chain and/or electron withdrawing groups, phycobiliproteins such as phycocyanins and phycoerythrins, fluorescent dyes such as erythrosin and fluorescein, the rhodopsins, bacteriorhodopsin, and their respective analogs.

Fulgides, as described in Kirkby et al., "Optical Nonlinearity and Resonant Bistability in Organic Photochromic Thin Films," p. 165 in *Optical Bistability III*, Gibbs et al. (eds.), Proceedings (Tucson, Arizona, Dec. 2–4, 1985, Springer, New York, 1985), include E-α-2,5-dimethyl-3-furyl ethylidene (isopropylidene) succinic anhydride, which has been shown to have a bleached state under UV (300–375 nm) illumination, and a colored state under green light (514 +/−50 nm) illumination. Thus, this fulgide should be useful in the all-optical devices described herein.

Phycobiliproteins are deeply colored, highly fluorescent photoreceptor pigments found in blue-green, red, and cryptomonad algae. These pigments are classified according to their absorption maxima, with phycocyanins having an absorption maximum in the blue wavelengths, phycoerythrins having an absorption maximum in the red wavelengths, and allophycocyanins which have an absorption maximum in the pale blue wavelengths. Phytochrome is a similar biliprotein found in plants, and exists in two forms that are interconverted upon alternate exposure to red and far-red light.

Rhodopsins, as found in most vertebrates, can be used in the all-optical devices, but are generally not preferred because they are difficult to stabilize for long periods of time. For example, human, octopus, mollusk, and insect rhodopsin, and analogs thereof, should be useful in the present invention.

On the other hand, a related molecule, bacteriorhodopsin (bR), is a preferred photochromic material for use in the all-optical devices, because of its high stability. Different forms, or analogs, of bR can be used in the all-optical devices to achieve different results. Bacteriorhodopsin can be chemically modified to tailor its optical properties, e.g., absorption bands and kinetic properties, for specific applications. These properties can be adjusted in a controlled manner, meaning that analogs of bR can be tailored to operate in combination with a wide range of light sources, such as diode lasers.

For example, the lifetime of the M state can be increased to lower the saturation intensity level of a particular bR-containing material at 410 +/−50 nm. This, in turn, can significantly lower the power requirements of devices manufactured using this material. For example, the M state lifetime can be increased by adjusting the pH to about 8 to 10 during manufacture of a thin polymer film containing bR. When the pH is increased in this manner, the saturation intensity level of the M state decreases.

The lifetime also can be altered by adding chemicals such as polyvalent metals, guanidine hydrochloride, diaminopropane, or ethylene diamine, to a polymer matrix including bR, or by creating mutant forms of the bR protein through genetic engineering. For example, the Asp residue at position 96 in the bR protein can be replaced by an Asn residue to increase the M state lifetime from 10 to 750 milliseconds. See, e.g., Birge, Computer, 56-67 (November 1992).

Further, the absorption bands for both the B and M states can be changed to enable the use of different wavelength input and modulation fields as described herein. For example, substituting an azulene derivative of retinal for the naturally-occurring retinal chromophore results in a bR molecule that has an absorption band shifted into the infrared portion of the optical spectrum. See, e.g., Asato et al., J. Am. Chem. Soc., 112:7390–7399 (1990). A 13-trifluoromethyl-retinal derivative brings the modified bR into the range of diode laser wavelengths. See, e.g., Gaertner et al., J. Am. Chem. Soc., 103:7642–7643 (1981). Using other retinal analogs, bR's absorption bands can be shifted to nearly any portion of the near-infrared/visible/near-ultraviolet spectrum. See, e.g., Oesterhelt et al., Quarterly Rev. Biophysics, 24:425–478 (1991).

For use in an all-optical device, bR is preferably dispersed into a polymer matrix and cast into a thin film that can be inserted into a device. Such a thin film can be prepared from the purple membrane of *Halobacterium halobium*, e.g., as follows.

The isolated membranes were first washed with deionized water and then passed through a 5 μm pore size filter to remove particulate matter. A stock solution of 40% (w/w) acrylamide was made with an acrylamide to N,N'-methylene-bis-acrylamide ratio of 20:1. A concentrated bR solution (3.5 ml) was then mixed with the acrylamide stock solution (0.5 ml). Two glass plates separated by three, 3 mm thick spacers were used to form a rectangular gel cassette. The gel solution was prepared by mixing a polymerization catalyst, ammonium persulfate (0.03% w/w), and an initiator, N,N,N',N'-tetramethylethylenediamine (1 μl/ml), with the bR/acrylamide solution. The gel solution was poured into the cassette immediately after preparation.

After polymerization, the cast gel was removed from the cassette and rinsed with deionized water. The gel was then soaked in a sodium borate buffer (pH 10, 10 mM) for 24 hours. The buffer-equilibrated gel was then covered with two gel-drying cellulose films and held firmly in a drying cell. The film was dried at room temperature for about 24 hours. The dried bR-polymer film was then held between two glass plates to prevent deformation.

The final film had an optical density of 2 absorbance units at 568 nm, 0.14 at 633 nm, and 0.45 at 458 nm. The final film preferably has an optical density of between 0.5 and 5 neutral density units at 570 nm. The preferred thickness of the film is between one millimeter and one micron. The main advantage of preparing the film using this method is that the M state lifetime can be varied by changing the pH of the soaking buffer solution.

The all-optical devices described herein exploit the dynamics of the B and M states, which are the two most stable states in the bR photocycle. For all practical purposes, the remaining short-lived intermediate states of the photocycle can be neglected, and the saturation dynamics of bR can then be analyzed using a simplified two level model. Thus, the population at the M and B states can be described by rate Equation 1:

$$\frac{dM}{dt} = \sigma_1 FB - \frac{M}{\tau} - \sigma_2 FM \qquad (1)$$

where F is the photon density flux of the incident field, M and B are the molecular populations per unit volume in the M and B states, respectively, $\sigma_1$, $\sigma_2$ are the absorption cross-sections for the nonradiative transitions B to M and M to B, respectively, and $\tau$ is the relaxation time for the M to B transition. The steady state solution of Equation 1 yields the population per unit volume of the M and B states as Equation 2:

$$B = N\left[\frac{1 + \sigma_2 F\tau}{1 + (\sigma_1 + \sigma_2)F\tau}\right] \qquad (2)$$

with M=N−B, where N is the number of bR molecules per unit volume of the sample.

The intensity dependent nonlinear absorption is described by the Equations 3a and 3b:

$$\alpha = N\sigma_1 \left[\frac{1 + 2\sigma_2 F\tau}{1 + (\sigma_1 + \sigma_2)F\tau}\right] = \alpha_o - \frac{gI}{1 + \frac{I}{I_s}} \qquad (3a)$$

$$\frac{dI}{dz} = -\alpha(I)I \qquad (3b)$$

where $\alpha_0 = N\sigma_1$, $g = N_1(\sigma_1 - \sigma_2)\tau/h\nu$, and the saturation intensity level $I_s = h\nu/(\sigma_1 + \sigma_2)\tau$. For light of wavelengths close to or greater than 570 nm, $\sigma_1 \gg \sigma_2$, and $\alpha(I)$ exhibits saturable absorption. The term $\alpha_0$ includes linear absorption as well as any loss due to scattering.

Independent of the slow thermal relaxation of the bR chromophore from the 13-cis M state configuration to the all-trans B state configuration, the transition can be stimulated using blue light in a time frame of several nanoseconds. For example, the source of blue light used in the devices described below had a wavelength of 458 nm. The net result of the presence of the blue light was to effectively increase the saturation intensity level of the bR film by several orders of magnitude at 410 +/−50 nm.

Figure 2:
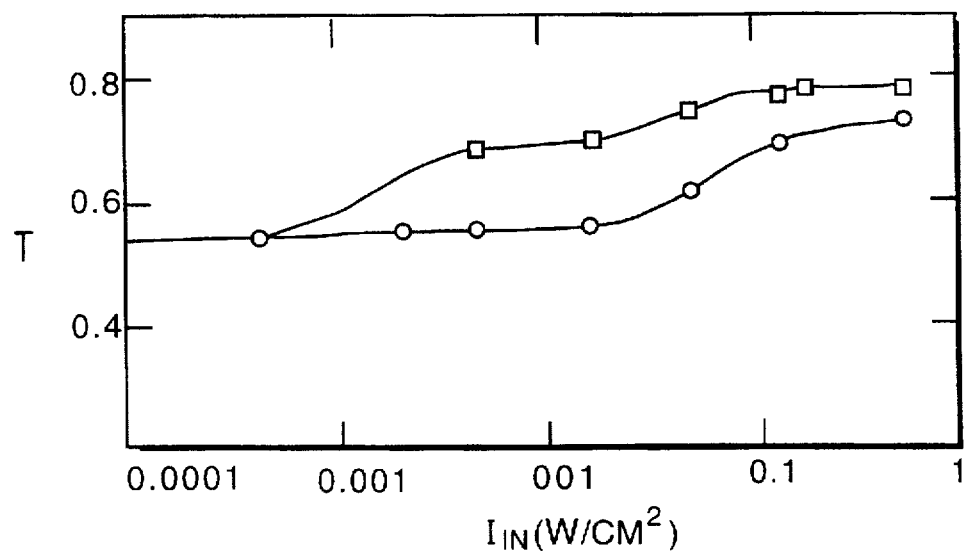
FIG. 2 is a graph of the saturation behavior of a bR film in the presence and absence of a blue modulation field as a function of incident red (632 nm) light intensity.

The saturation behavior, or transmission (T), of the bR film was monitored in the presence and absence of a blue field as a function of the incident red light intensity ($I_{IN}$ (W/cm$^2$)). The results are shown in the graph of FIG. 2, in which squares represent data obtained in the absence of blue light, and circles represent data obtained when a 458 nm wavelength blue light is-simultaneously present. The source of the incident red light had a wavelength of 632 nm. When only the red field is present, the saturation intensity level of the bR film is 1.3 mW/cm$^2$, based on numerically fitting the data in the graph of FIG. 2 into Equation 3. However, when a blue field of intensity 1.1 W/cm$^2$ is simultaneously present, the saturation intensity level increases to 50 mW/cm$^2$. Further increasing the blue light intensity increases the saturation intensity level accordingly.

Four-Wave Mixing Optical Geometries

The all-optical devices described herein all use a four-wave mixing (FWM) geometry of the input fields and the output, or signal, fields. These fields can be created by coherent radiation fields, e.g., laser beams. The key to a FWM geometry is that there are three input fields that are phase-matched with a fourth output, or signal field, i.e., the sum of the wave vectors for the four interacting fields must be zero.

There are several configurations that can be used to establish a FWM geometry including backward degenerate FWM (DFWM), two-color backward DFWM, and so-called "boxcar" FWM. For example, in a boxcar FWM geometry, the bR film is situated in the center of a hypothetical three-dimensional parallelepiped, and the input fields are arranged to strike the film along three diagonal internal axes of the parallelepiped. The output, signal field is generated along the fourth diagonal internal axis.

In a backward degenerate FWM geometry, e.g., as described in Rao et al., Appl. Phys. Lett., 58:1241 (1991), first and second input fields impinge the photochromic material sample, e.g., a bR film, from opposite sides and directly in line, i.e., 180° apart, and a third input field strikes the film usually at a small angle, e.g., from 1° to 60°, more preferably from 1° to 20°, from the first two fields. In particular, a single vertically polarized laser beam is split into three fields, i.e., two counter-propagating pump radiation fields $E_1(\omega,t)$ and $E_2(\omega,t)$ (forward and backward fields), and a third probe field $E_3(\omega,t)$ incident at a small angle with respect to the direction of the forward field. These three fields are spatially overlapped in the sample to produce a periodic intensity grating or "interference pattern" (an optical interference pattern consisting of alternating "light" and "dark" regions in the bR film) which can be represented by Equation 4:

$$I(x) = (I_{fp} + I_p) \cdot \left(1 + C \cdot \cos\left(\frac{2\pi x}{\Gamma}\right)\right) \quad (4)$$

where $I_{fp}$ and $I_p$ are the intensities of the forward (pump) field and probe field, respectively. The contrast of the fringe pattern (C) is given by Equation 5:

$$C = \frac{2\sqrt{I_{fp}I_p}}{I_{fp} + I_p} \quad (5)$$

The periodicity $\Gamma$ of the absorptive or phase grating (periodic intensity grating) is given by Equation 6:

$$\Gamma = \lambda/2\sin\theta \quad (6)$$

where $\lambda$ is the wavelength of the DFWM fields and $\theta$ is the half angle between forward field (beam) and the probe field (probe beam).

This periodic intensity grating is responsible for the diffraction of the backward field, which appears as the fourth, output field $E_4(\omega,t)$. The output field is a phase-conjugate replica of the probe field, and counter-propagates along the same direction as the probe field. The diffraction efficiency for the intensity grating $\eta$ is defined as the ratio of the diffracted phase-conjugate intensity $I_{pc}$ to the backward field intensity $I_b$, and is given by Equation 7:

$$\eta = \frac{I_{pc}}{I_b} = \left[\sin^2\left(\frac{\pi n_1 d}{\lambda \cos\theta}\right) + \sinh^2\left(\frac{\alpha_1 d}{2\cos\theta}\right)\right] \exp\left(\frac{-2\alpha_0 d}{\cos\theta}\right) \quad (7)$$

where $\lambda$ is the wavelength of the input fields, d is the thickness of the film, $\theta$ is the half angle between the forward field and the probe field, $\alpha_0$ is the average absorption coefficient in the grating, and $n_1$ and $\alpha_1$ are the modulation amplitudes of the refractive index and absorption coefficient, respectively.

The wavelengths used in the examples below have a large diffraction efficiency and a relatively low absorption. The optimum wavelength of each of the input fields is at the maximum change in the refractive index in one of the stable states of the photochromic material. This can be determined by obtaining a spectrum of the photochromic material in two of its states, and using the Kramers-Kronig dispersion relations to calculate the point of maximum change in the refractive index.

By adjusting the relative intensities of the input fields, the intensity of the output field can be controlled. The signal of the output field is obtained by physically separating the phase-conjugate output field with a beam splitter and measuring the field intensity, for example, with a photomultiplier tube or silicon detector.

All-Optical Switch and Modulator

Figure 3:
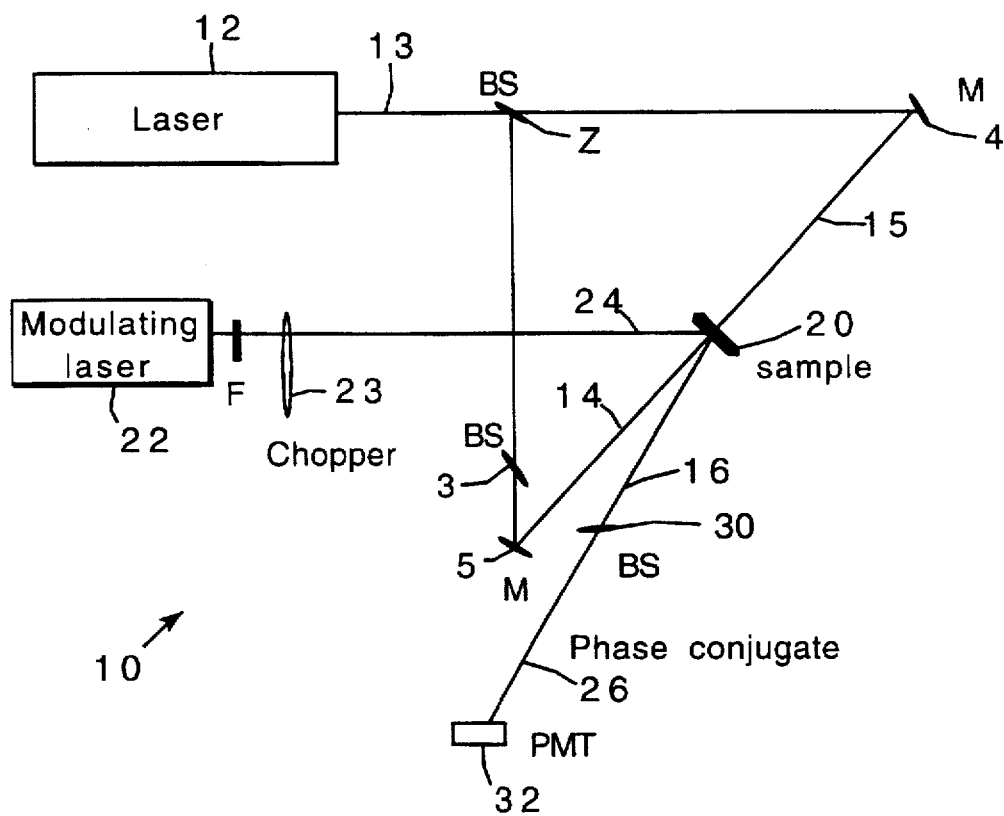
FIG. 3 is a schematic drawing of an all-optical device that operates as an optical switch or modulator.

As shown in FIG. 3, an all-optical switch and light intensity modulator 10 includes a laser 12 to generate the three input fields 14, 15, and 16, that strike sample 20, which contains a photochromic material, such as bR, having a low saturation intensity level. For this device, bR should have a saturation intensity level of between 0.1 and 10 mW/cm$^2$ at 632 +/−50 nm and between 0.1 and 1 W/cm$^2$ at 570 +/−100 nm. As shown in FIG. 3, a single beam 13 is split and directed by beam splitters 2, 3, 30 (BS) and mirrors 4, 5 (M) into the three separate input fields 14, 15, and 16. Input field 14 is the forward field, input field 15 is the backward field, and input field 16 is the "probe" field. For example, laser 12 can be a Spectra Physics He-Ne cw laser, with an output at 632 nm at a power level of 10 mW/cm$^2$. The source can be any laser with a wavelength of 570 +/−100 nm and a power of 10 mW/cm$^2$.

The beam splitters and mirrors are arranged such that the three input fields form the backward degenerate FWM geometry described above. Thus, these input fields can form an intensity grating in sample 20 under certain levels of saturation of the photochromic material. When generated, the output field 26 (which is diffracted from this grating from probe field 16) is phase-matched with the three input fields, so that the sum of the wave vectors for the four interacting fields is zero. Other arrangements than that shown in FIG. 3 are possible.

A second laser 22 is used to generate a modulating field 24, which also strikes sample 20 in the same region as the input fields. When the photochromic material is bR and the input fields are red (620 to 640 nm), the modulating field will be blue light at a wavelength of about 460 nm. The modulating field should have a wavelength of 410 +/−50 nm and should have an intensity that is comparable to or larger than the input field intensity. If the input fields are blue, the modulating field should be selected at a wavelength of about 570 nm, for a yellow light beam. For example, laser 22 can be a Coherent Innova 70 Spectrum Argon-Krypton cw laser with an intracavity prism tuned to a wavelength of 458 nm to create a blue modulating field 24.

As described in further detail below, in this arrangement, the signal field 26 is generated only when modulating field 24 is on. The modulated signal is obtained by physically separating the signal field 26 with the aid of beam splitter 30, and the field intensity is measured with photomultiplier tube 32, e.g., a Hamamatsu R298.

The optimum wavelength for the modulating field 24 is determined by balancing between the maximum absorption and the maximum change in the index of refraction. For example, if the degenerate FWM input fields are red, the wavelength of the modulating field should be near the absorption maximum of the M state (410 nm). If the input fields are blue, then the wavelength of the modulating field should be near the absorption maximum of the B state.

The modulating field 24 overlaps in the region of the bR film in sample 20 where the degenerate FWM interaction takes place. The diameter of the modulating field spot is generally slightly larger than that of the input fields, although a modulating field with a smaller diameter spot will also work. A mechanical chopper 23 with different aperture sizes, or a rotating mirror with a fixed aperture, is used to modulate the intensity of modulating field 24.

As an alternative, an electro-optic modulator including an electroded, z-cut Lithium Niobate crystal can be used in place of chopper 23 to modulate field 24. This type of modulator provides greater flexibility in modulating field 24. In addition, when using bR as the photochromic material, the modulating field 24 can be derived from other sources such as argon ion lasers and mercury lamps, since the photochemical M to B transition can be stimulated with a broad range of wavelengths in the short wavelength region of the optical spectrum (i.e., 410 +/−50 nm).

The degenerate FWM (DFWM) signal field 26 arises as a result of the intensity grating that is formed from the B to M state transition when modulating field 24 is on. The change in the index of refraction is governed by the Kramers-Kronig dispersion relations. In a specific example, as a result of the photochromic transition induced by the red input fields 14, 15, and 16 (in the absence of the modulating field), in the region of the DFWM interaction, and the low saturation intensity level of the film, the B to M transition is saturated, and all the bR in the region is switched to the M state. This saturation happens at relatively low intensities of the input fields (e.g., less than 2 mW/cm$^2$) for these bR films because of the long thermal relaxation time of the M to B transition, which is of the order of tens of seconds.

As a result of the saturation, no intensity grating is formed since all of the bR molecules in the sample 20 remain in the M state, and the dark interference regions in the grating are "washed" away by light scattered from the light interference regions because of inhomogeneities in the bR film.

When blue light modulating field 24 is on simultaneously with red light input fields 14, 15, and 16, a fast photochemical reaction is induced that reverts the bR molecules in the M state back to the initial B state within less than a few microseconds. Thus, the presence of the blue modulating field 24 enables the photocycle to occur on a short time scale. An intensity grating is therefore formed and a phase-conjugate signal field 26 is generated. The uniform blue light illumination also prevents the washing out of the interference fringes.

Any information encoded in modulating field 24 is reproduced in the phase-conjugate field 26. Thus, this all-optical device functions as a switch if modulating field is merely turned on and off, or as a modulator, if modulating field 24 encodes information, e.g., a video signal.

Figure 4:
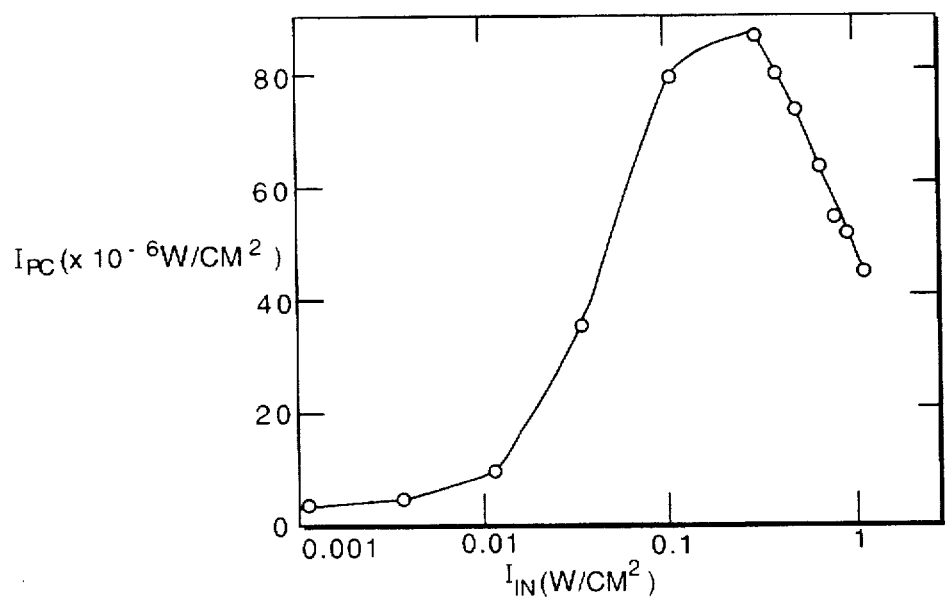
FIG. 4 is a graph of the intensity of a phase-conjugate signal field as a function of incident modulating field intensity.

In one example, the generation of the phase-conjugate signal field 26 was monitored as a function of the blue modulating field intensity at a fixed intensity of the red input fields 14, 15, and 16. The forward input field 14, and the third input (probe) field 16 were each set at an intensity of 67 mW/cm$^2$, and the second (backward) field 15 was set at an intensity of 55 mW/cm$^2$. The data obtained are shown in FIG. 4. Different curves will be obtained if the intensities of the DFWM input fields are changed. The curve peak will shift towards higher or lower intensities with an increase or decrease of the intensities of the red input fields, respectively.

The great sensitivity of the chemically stabilized bR film is due, in part, to its low saturation intensity level at 570 +/−100 nm. Thus, the input fields used in this DFWM setup can have an extremely weak intensity, e.g., 0.8 mW/cm$^2$ for the backward field (beam 15), 0.75 mW/cm$^2$ for the forward field (beam 14), and 0.78 mW/cm$^2$ for the probe field 16. The sum of intensities of the three input fields should be greater than the saturation intensity level of the film at the wavelength of the input fields. These powers can easily be achieved with currently available low power lasers, e.g., laser diodes.

The blue modulating field 24 is chopped in pulses with average powers in the range 60 to 500 µW/cm$^2$. The use of this type of geometry and the wavelengths chosen make the light modulation process dependent only on the dynamics of the B to M transition and the control of the photochemical transition back to the B state triggered by the blue light. This arrangement takes advantage of the great sensitivity afforded by the low saturation intensity levels while not being constrained on a time scale by the long thermal relaxation lifetime. Modulations with 0.4 millisecond pulses and repetition rates of 250 Hz have been achieved with this device, limited only by the speed of the rotating mirror used in the experiments.

An added advantage is that this technique affords great signal to noise contrast since the phase-conjugate signal field 26 is either nonexistent or present. The device can also be used as an all-optical switch where a low power pulse switches on the output, signal field.

The use of this device can be easily extended to obtain spatial light modulation by the use of a pixelated, chemically enhanced bR sample, which would allow the implementation of optical processing algorithms. For example, Haronian et al., Appl. Phys. Lett., 61:2237 (1992) describes the microfabrication of electroded bR thin film pixels of 50 µm×50 µm size on quartz substrates. They reported that the size of the bR micro pixels was limited only by the physical mask used and diffraction issues. Thus, in principle, micrometer-size bR devices are feasible. Further, image processing in an unpixelated film can be easily achieved by selectively cancelling or enhancing the desired Fourier frequency components of the image.

All-Optical Logic Gates

Logic gates are the basic building blocks in digital computers. These gates (switches) have two stable states often referred to as logic 0 and logic 1. Computers encode all information in terms of these two logic states or bits. The all-optical devices described below can be used to implement both AND and OR all-optical logic gates using the two-color backward DFWM geometry described above. All other gates can be developed using combinations of these two using standard combination techniques. The photochromic materials used in the examples below are wild-type and chemically stabilized films of bR having different saturation intensity levels.

In the example below, red light input fields were used to form an intensity grating in the bR sample due to the B to M transition, and blue light input fields were used to form an intensity grating in the same sample due to the fast photochemical transition from M to B. Devices can also be created based on other combinations of states in the photocycle provided that there is a photochemical process that can interconvert the two states, e.g., the B state and the O state. The blue and red fields can be easily interchanged, or shifted to different wavelengths (i.e., out of the blue and red regions) depending on the nature of the photochromic material. Each of the two wavelengths in the device acts as an input to the all-optical gate and the phase-conjugate output signal field bears the output of the gate.

Figure 5:
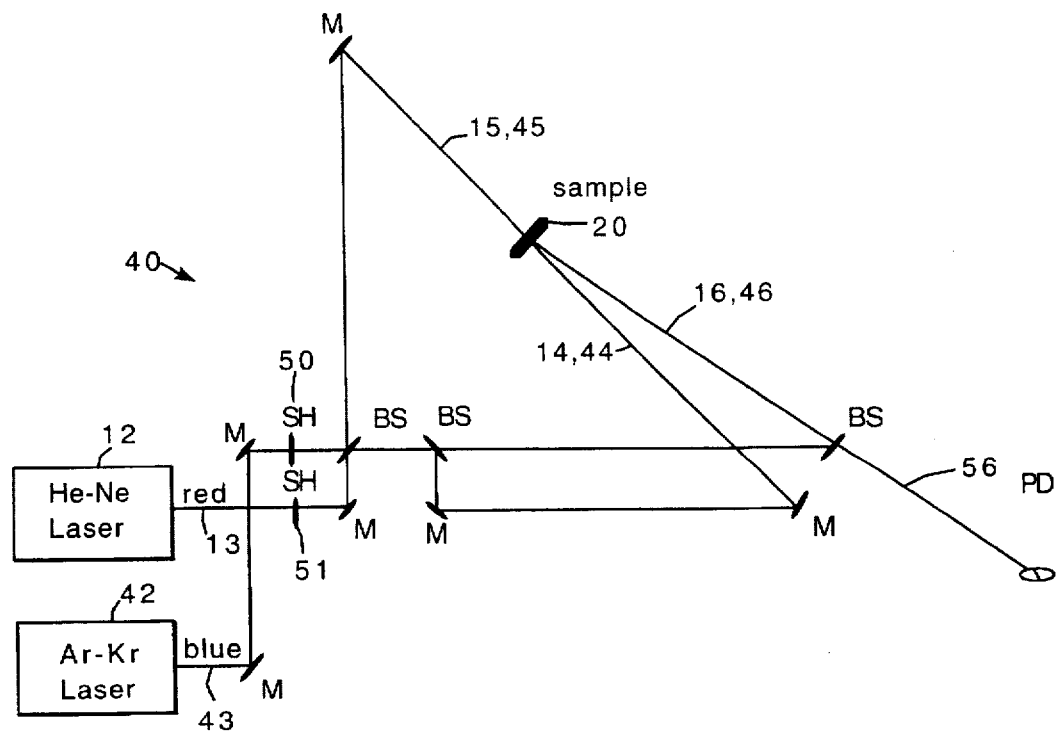
FIG. 5 is a schematic drawing of an all-optical device that operates as an AND gate or an OR gate.

An all-optical logic gate is shown in FIG. 5. The same geometry is used to create either an AND gate and an OR gate, as described in further detail below. The device 40 consists of a laser 12, e.g., a Spectra Physics He-Ne cw laser with an output at 632 nm, which is used to generate all red input fields 14, 15, and 16, from a single field 13. A second laser 42, e.g., a Coherent Innova 70 Spectrum Argon-Krypton cw laser tuned to give 458 nm wavelength laser light, is used to generate all of the blue input fields 44, 45, and 46, from a single field 43. All input fields are arranged in a DFWM geometry as described above with red and blue input fields traveling along the same optical paths, and all striking the photochromic material-containing sample 20.

The input field geometry is the same as for the all-optical modulator and switch 10 described above, except that in the present example two wavelengths follow the same input field paths. Mechanical shutters 50, 51 are used to control the red and blue fields, respectively. Depending on the saturation intensity level of the photochromic material and the intensities of the input fields, the blue and red input fields can form a complex intensity grating in the bR film in sample 20, which in turn generates an output signal field 56 that bears the wavelengths of both input fields, e.g., both red and blue.

Both logic gates are implemented in the same device 40. The parameter that determines operation as an AND or an OR gate is the saturation intensity level of the bR sample. Thus, any of the previously mentioned methods known to affect the lifetime of the M state can be used to tailor the optical gates for a given application. Conversely, by adjusting the intensities of the input fields, various bR films, or other photochromic-materials or their analogs, can be used to manufacture both AND and OR gates. The combination of these factors offers remarkable engineering flexibility.

Figure 6:
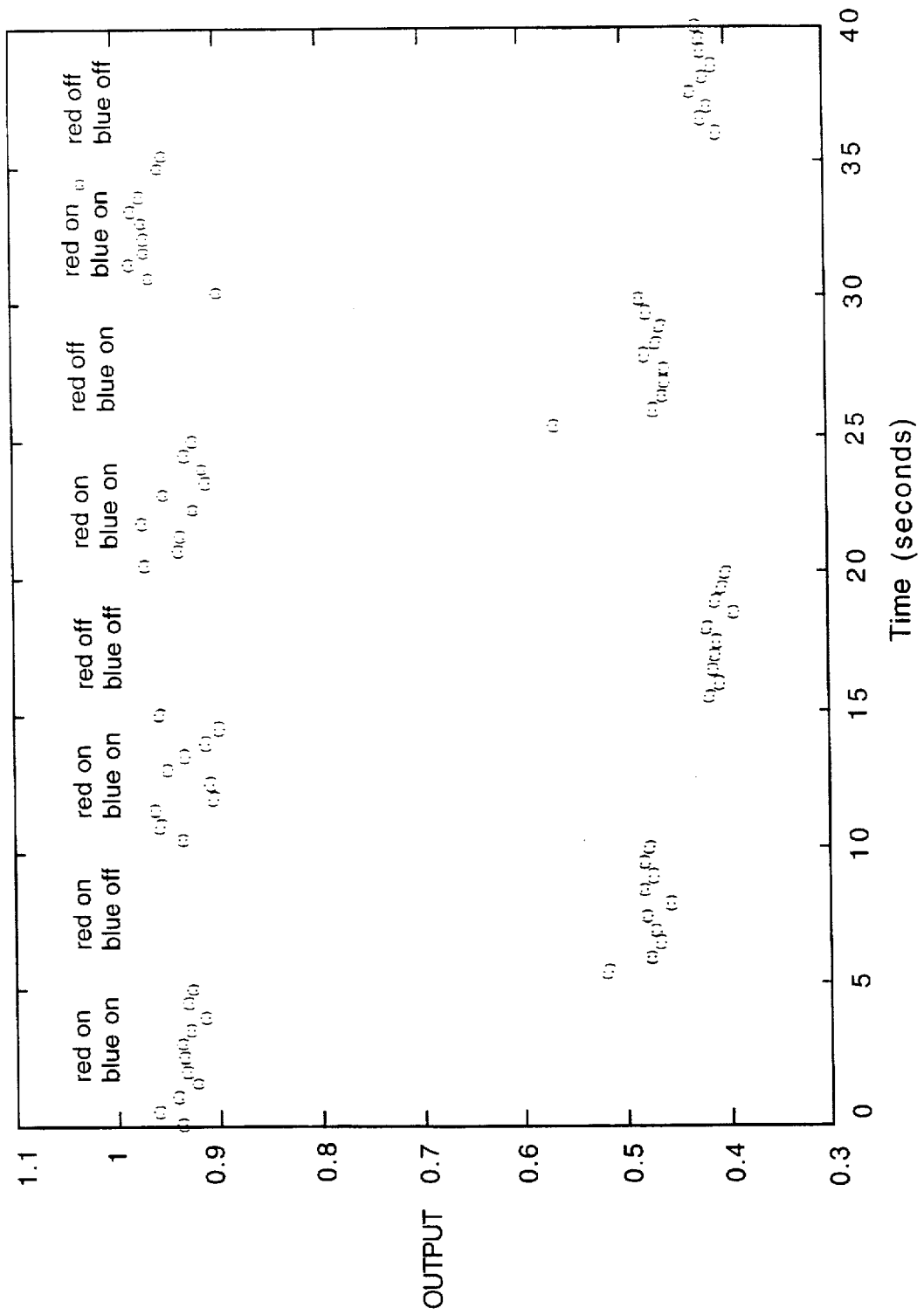
FIG. 6 is a plot showing the time-dependent intensity of a phase-conjugate signal generated by the device of FIG. 5 functioning as an AND gate.
Figure 7:
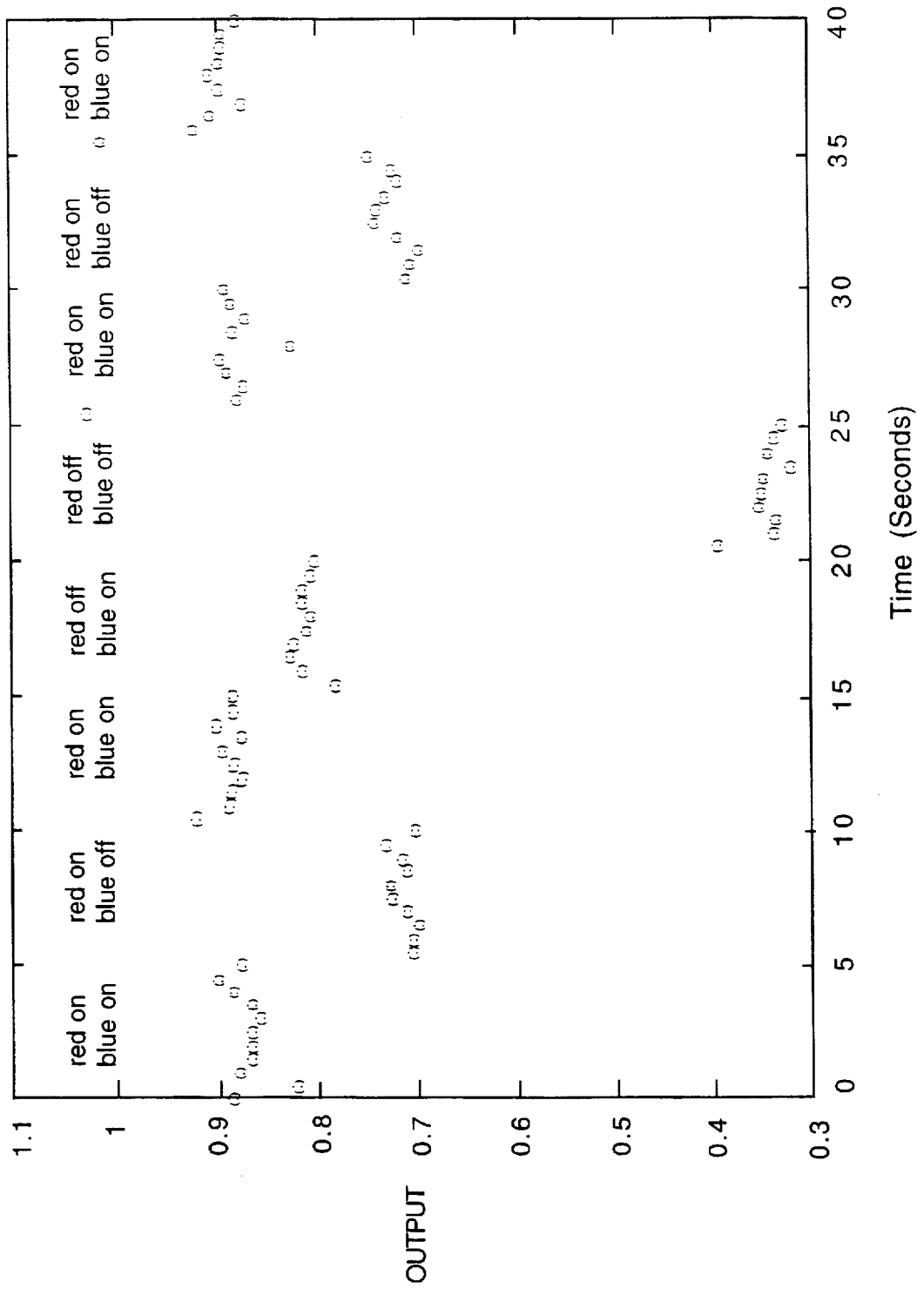
FIG. 7 is a plot showing the time-dependent intensity of a phase-conjugate signal generated by the device of FIG. 5 functioning as an OR gate.

Further, these devices afford satisfactory signal-to-noise contrast since the logic states are separated by three divisions (in relative units) as shown in FIGS. 6 and 7. The phase-conjugate output signal field 56 bears the wavelengths of both input fields traveling in the same direction. Thus, care must be taken in the event of cascading gates that the medium in which the output signal is to propagate is equally transparent to both wavelengths. The output signal can be separated into its two constituent wavelengths, e.g., by color filtering or by polarizing the input fields and using polarizing filters to separate the output field, to make flexible inputs for other logic gates.

In theory, the limiting factors for the switching speed of the gates are the B to M transition time, and the M to B photochemically induced transition time. These times are known to be of order microseconds and nanoseconds respectively. However, the switching speeds of the gates can be controlled in several ways: first, through the use of pulsed lasers that deliver sufficient energy to saturate either transition in a short time; second, by optimizing the separation between successive input pulses; and third, by modifying the sensitivity of the bR film by genetic engineering, or changing the chromophores and their analogs as discussed herein.

In the device described herein, the switching speed was actually limited by the modulator, not the bR material. A simple modulator was used to operate the gates with 400 microsecond switching pulses at repetition rates of 250 Hz. An electro-optic modulator will provide nanosecond and picosecond duration pulses, and thus more flexibility.

A careful choice of input field wavelengths permits the adjustment of relative diffraction efficiency to enhance the relative amount of one wavelength to another in the phase-conjugate output field. The diffraction efficiency $\eta$ is defined as the ratio of the diffracted phase-conjugate intensity $I_{pc}$ to backward field intensity $I_b$ and is given by Equation 7 (above).

Both wavelengths used in the logic gate described device have large diffraction efficiencies and relatively low absorption. By adjusting the relative blue to red light intensities we were able to control the intensity of each in the output field. The relative diffraction efficiency and the saturation properties of the bR film can be adjusted to optimize the temporal and spectral properties of the gates. These devices afford great contrast between the on and off states of the output.

Optical logic gates are preferably formed around single regions of bR-containing films (or other materials containing bR or other protein pigments). Bacteriorhodopsin films also can be incorporated into a wide range of optical devices featuring one or two-dimensional arrays of pixelated, bR-containing regions. In addition, small-scale devices can be fabricated where individual molecules of bR function as either AND or OR gates. These devices can be used in applications such as spatial light modulation, optical image processing, and optical parallel processing. Devices incorporating these structures have applications in various fields including optical data storage media, and optical computers.

AND Gate

To form an AND gate using the configuration described above, the saturation intensity level of the photochromic material, e.g., bR film, and the intensities of the input fields, are selected such that the sample is above the saturation level when either the red fields or the blue fields alone are striking the sample, but is below the saturation level when both the red and blue fields are present. A bR film made as described above and having an observed saturation intensity level $I_S$ of about 0.1 to 100 mW/cm$^2$, and preferably about 1.0 to 2.0 mW/cm$^2$, is a suitable photochromic material to make an AND gate when the input red and blue field intensities are set at low intensities on the order of 0.2 to 500 mW/cm$^2$, and preferably from 1.0 to 100 mW/cm$^2$ (e.g., 25 mW/cm$^2$) (before the beams are split into the three separate input fields in the DFWM arrangement). The actual film used had a saturation intensity of 1.3 mW/cm$^2$ at 632 nm.

The saturation level of the photochromic material, e.g., bR film, can be determined using standard techniques. Briefly, the sample is illuminated with one input field at a given wavelength over a range of intensities, and the transmission of the sample is plotted versus intensity of the input field (transmission will increase with increasing intensity). The saturation level is determined as the inflection point of the curve generated on the transmission versus intensity plot.

Thus, when only red light (input fields 14, 15, and 16) is present in the region of interaction in sample 20, the B to M transition is locally saturated in the regions of constructive interference. Light scattering by inhomogeneities in the film will further saturate the regions where the red fields interfere destructively. The result is that all the bR molecules in the region will be in the M state, and no intensity grating is formed. Thus, no output signal is generated.

In an analogous fashion, when only blue light (input fields 4, 45, and 46) illuminates sample 20, all the bR molecules in the region are in the B state, no intensity grating is formed, and no output signal is generated. The absorption of the red or blue light is saturated in each case.

Saturation is observed at very low intensities of the incident light fields because of the long thermal relaxation time of the M to B transition, which is of the order of tens of seconds. When both red and blue input fields are simultaneously present, two intensity gratings are created, and dual output signal phase-conjugate fields 56, 57 are generated. The fast photochemical reaction that reverts the bR molecules in the M state back to the initial B state within less than a few microseconds implies that the effect of the simultaneous presence of the two wavelengths is an increase in the saturation intensity level by at least two orders of magnitude. A complex intensity grating will therefore be formed and phase-conjugate fields 56, 57 having both wavelengths will appear. Light scattered at both wavelengths prevents the local saturation of bR molecules in either B or M states provided that the relative intensity of blue to red light is appropriate. The intensities of the red and blue beams are typically approximately the same. It is preferred that the ratio of intensities be between 0.3 and 1.7.

The device functions as an AND gate since an output signal is generated only when both red and blue input fields are present. Of course, when neither red nor blue fields are present, there is also no output signal. The output of the AND gate is shown in FIG. 6.

FIG. 6 is a plot showing the time-dependent intensity of the phase-conjugate signal generated with the optical system of FIG. 5 and a bR-containing film that allows the device to function as an AND gate. The phase-conjugate output signals 56, 57 are plotted along the y axis in arbitrary units. As is clear from FIG. 6, the output fields are present between 0 and 5 seconds, 10 and 15 seconds, 20 and 25 seconds, and 30 and 35 seconds, when both red and blue input fields are on. There are no output fields when only the red field is on (between 5 and 10 seconds), when only the blue field is on (between 25 and 30 seconds), and when neither field is on (between 15 to 20 seconds, between 35 and 40 seconds). The sharp separation between the on and off states of the AND gate are apparent from the graph.

OR Gate

An OR gate is implemented at the same input field intensity levels by using a photochromic material that has a higher saturation intensity level (than used in the AND gate described above) selected such that the sample is below the saturation intensity level when either the red fields or the blue fields alone are striking the sample, and when the red and blue fields are both present.

In particular, a wild-type bR film purchased from Wacker Chemical (U.S.A.) Inc. (Wacker Cat. No. BR-WT-MI-05N), for which the saturation intensity level for red and blue wavelengths is two to three orders of magnitude higher than that of the chemically enhanced bR film used in the AND gate described above, can be used to make an OR gate. This film is 35 µm thick with bR dispersed in a polymer matrix, and has a saturation intensity level of 200 mW/cm$^2$ at 632 nm. Output signal field 56 is generated when both input red and blue fields are on, as well as when either blue or red fields are on individually, because at this intensity level (25 mW/cm$^2$), sample 20 is well below the saturation intensity level of bR in either state. The range of intensities is between 0.1 and 150 mW/cm$^2$.

When only blue light is on, an output signal is generated, because when both wavelengths are off not all the molecules are in the B state. If the OR gate is operated under ambient light conditions, there will always be a small fraction of molecules in the M state due to ambient light. If the OR gate is operated in absolute darkness, again a fraction (roughly 50%) of the molecules are in the M state (the "dark adapted state"). Problems may arise if the OR gate is operated under ambient light composed spectrally of only deep blue, violet, or near-ultraviolet wavelengths. Thus, the output signal fields 56, 57 will be absent only when both fields are off. The output of the OR gate is shown in FIG. 7.

FIG. 7 shows the time-dependent phase-conjugate output fields generated using the device of FIG. 5 and a bR-containing film that allows the device to function as an OR gate. The output fields are generated when fields of both wavelengths are on (between 0 and 5, 10 and 15, 25 and 30, and 35 to 40 seconds), when only the red field is on (between 5 and 10 seconds, and between 30 and 35 seconds), and when only the blue field is on (between 15 and 20 seconds). No signal field is generated when neither field is on (between 20 and 25 seconds). The sharp separation between the on and off states of the OR gate are apparent from the graph.

Other Embodiments

It is to be understood that while the invention has been described in conjunction with the detailed description thereof, that the foregoing description is intended to illustrate and not limit the scope of the invention, which is defined by the scope of the appended claims. Other aspects, advantages, and modifications are within the scope of the following claims.

What is claimed is:

1. An all-optical modulator comprising:

a photochromic material with first and second stable states;

a radiation source to generate three input radiation fields configured to spatially overlap within the photochromic material, wherein each input radiation field is set at a wavelength and intensity to maintain the photochromic material in the second stable state;

a modulating radiation source to generate a modulating radiation field, wherein the modulating radiation field is configured to strike the photochromic material, and is set at a wavelength and intensity to convert the photochromic material to the first stable state; and a radiation detector arranged to detect an output radiation field, wherein the output field is generated only when the modulating radiation field converts the photochromic material to the first stable state, which enables the three input radiation fields to produce a periodic intensity grating in the photochromic material, and thereby generate the output radiation field, which is phase-matched with the three input radiation fields.

2. The all-optical modulator of claim 1, wherein the three input radiation fields comprise first and second input radiation fields and a probe input radiation field, and wherein the output radiation field counter-propagates along the same optical path as the probe field.

3. The all-optical modulator of claim 2, wherein the first and second input radiation fields are configured to strike opposite sides of the photochromic materials in a backward degenerate four-wave mixing geometry.

4. The all-optical modulator of claim 2, wherein the first and second input radiation fields are configured to strike opposite sides of the photochromic materials in a boxcar four-wave mixing geometry.

5. The all-optical modulator of claim 1, wherein the photochromic material is an organic photochromic fulgide, cytochrome C, an azo dye, a carbazole compound with a conjugated side chain and/or electron withdrawing groups, a phycobiliprotein, a fluorescent dye, a rhodopsin, bacteriorhodopsin, or an analog of any of said materials.

6. The all-optical modulator of claim 5, wherein the photochromic material is bacteriorhodopsin or a bacteriorhodopsin analog.

7. The all-optical modulator of claim 6, wherein the first stable state is a B state, and the second stable state is an M state.

8. The all-optical modulator of claim 6, wherein the input radiation fields are set at a wavelength of 480 to 770 nm, and the modulating radiation field is set at a wavelength of 300 to 480 nm.

9. The all-optical modulator of claim 6, wherein the input radiation fields are set at a wavelength of 620 to 640 nm, and the modulating radiation field is set at a wavelength of 450 to 470 nm.

10. The all-optical modulator of claim 1, wherein said modulating radiation field carries a constant signal, either on or off, whereby said modulator operates as an all-optical switch.

11. The all-optical modulator of claim 1, wherein said modulating radiation field carries a modulating signal, and said output field is modulated according to the modulating signal.

12. The all-optical modulator of claim 11, wherein said modulating signal is a video signal.

13. The all-optical modulator of claim 1, wherein the input radiation fields are beams generated by a first laser.

14. The all-optical modulator of claim 1, wherein the modulating radiation field is a beam generated by a second laser.

15. An all-optical logic gate comprising:
a photochromic material with first and second stable states;
a first radiation source to generate a first logic gate input at a first wavelength, wherein said first gate input is split into a set of three input radiation fields configured to spatially overlap within the photochromic material;
a second radiation source to generate a second logic gate input at a second wavelength, wherein said second gate input is split into a set of three input radiation fields configured to spatially overlap within the photochromic material with each other and with the set of input radiation fields of the first logic gate input; and a radiation detector arranged to detect a logic gate output radiation field bearing both first and second wavelengths, wherein said logic gate output is generated only when the two sets of radiation fields of both logic gate inputs each produce a periodic intensity grating in the photochromic material, and thereby generate the output radiation field, which is phase-matched with the two sets of radiation fields of both logic gate inputs.

16. The all-optical logic gate of claim 15, wherein the two sets of three input radiation fields each comprise first and second input radiation fields and a probe input radiation field, and wherein the logic gate output radiation field counter-propagates along the same optical path as the two probe fields.

17. The all-optical logic gate of claim 15, wherein the two sets of first and second input radiation fields are configured to strike opposite sides of the photochromic materials in a backward degenerate four-wave mixing geometry.

18. The all-optical logic gate of claim 15, wherein the two sets of first and second input radiation fields are configured to strike opposite sides of the photochromic materials in a boxcar four-wave mixing geometry.

19. The all-optical logic gate of claim 15, wherein the photochromic material is an organic photochromic fulgide, cytochrome C, an azo dye, a carbazole compound with a conjugated side chain and/or electron withdrawing groups, a phycobiliprotein, a fluorescent dye, a rhodopsin, bacteriorhodopsin, or an analog of any of said materials.

20. The all-optical logic gate of claim 19, wherein the photochromic material is bacteriorhodopsin or a bacteriorhodopsin analog.

21. The all-optical logic gate of claim 20, wherein the first stable state is a B state, and the second stable state is an M state.

22. The all-optical logic gate of claim 20, wherein the first logic gate input is set at a wavelength of 480 to 770 nm, and the second logic gate input is set at a wavelength of 300 to 480 nm.

23. The all-optical logic gate of claim 20, wherein the first logic gate input is set at a wavelength of 620 to 640 nm, and the second logic gate input is set at a wavelength of 450 to 470 nm.

24. The all-optical logic gate of claim 15, wherein the first logic gate input is a field generated by a first laser.

25. The all-optical logic gate of claim 15, wherein the second logic gate input is a field generated by a second laser.

26. The all-optical logic gate of claim 15, wherein a saturation intensity level of the photochromic material, and intensity levels of the logic gate inputs, are selected such that the photochromic material is above the saturation intensity level when either of the two logic gate inputs are on, and is below the saturation intensity level when both logic gate inputs are on simultaneously, thereby enabling the two sets of radiation fields of both logic gate inputs to each produce a periodic intensity grating in the photochromic material and generate the output radiation field only when both logic gate inputs are on, wherein said logic gate operates as an AND gate.

27. The all-optical logic gate of claim 26, wherein the photochromic material is bacteriorhodopsin having a saturation intensity level of between 0.1 and 100 $mW/cm^2$ at wavelengths of 300 to 770 nm.

28. The all-optical logic gate of claim 27, wherein the first logic gate input has a wavelength of 480 to 770 nm and an intensity of 1 to 500 $mW/cm^2$, and the second logic gate input has a wavelength of 300 to 480 nm and an intensity of 1 to 500 mW/cm², wherein the intensity of the first and second logic gate inputs is greater than the saturation intensity level.

29. The all-optical logic gate of claim 15, wherein a saturation intensity level of the photochromic material, and intensity levels of the logic gate inputs, are selected such that the photochromic material is below the saturation level when either of the two logic gate inputs are on individually, and when both logic gate inputs are on simultaneously, thereby enabling the two sets of radiation fields of both logic gate inputs to each produce a periodic intensity grating in the photochromic material and generate the output radiation field when either or both logic gate inputs are on, wherein said logic gate operates as an OR gate.

30. The all-optical logic gate of claim 29, wherein the photochromic material is bacteriorhodopsin having a saturation intensity level of 10 to 1000 mW/cm² at wavelengths of 300 to 770 nm.

31. The all-optical logic gate of claim 30, wherein the first logic gate input has a wavelength of 470 to 770 nm and an intensity of 0.1 to 150 mW/cm², and the second logic gate input has a wavelength of 300 to 480 nm and an intensity of 0.1 to 150 mW/cm².

32. A method for modulating an optical input to provide a modulated optical output, said method comprising the steps of:

irradiating a photochromic material having first and second stable states with the optical input, wherein the optical input is split into three input radiation fields configured to spatially overlap within the photochromic material, and wherein each input radiation field is set at a wavelength and intensity to maintain the photochromic material in the second stable state;

irradiating the photochromic material with a modulating radiation field, wherein the modulating radiation field is configured to strike the photochromic material, and is set at a wavelength and intensity to convert the photochromic material to the first stable state; and detecting a modulated optical output, wherein the output is generated only when the modulating radiation field converts the photochromic material to the first stable state, which enables the three input radiation fields to produce a periodic intensity grating in the photochromic material, and thereby generate the modulated output, which is phase-matched with the three input radiation fields.

33. The method of claim 32, wherein the three input radiation fields comprise first and second input radiation fields and a probe input radiation field, and wherein the modulated output counter-propagates along the same optical path as the probe field.

34. The method of claim 32, wherein the photochromic material is bacteriorhodopsin or a bacteriorhodopsin analog.

35. The method of claim 32, wherein said modulating radiation field carries a constant signal.

36. The method of claim 32, wherein said modulating radiation field carries a modulating signal, and said optical output is modulated according to the modulating signal.

37. A method of generating an all-optical logic gate output, said method comprising the steps of:

irradiating a photochromic material having first and second stable states with a first logic gate input at a first wavelength, said first gate input being split into a set of three input radiation fields configured to spatially overlap within the photochromic material;

irradiating the photochromic material with a second logic gate input at a second wavelength, said second gate input being split into a set of three input radiation fields configured to spatially overlap within the photochromic material with each other; and spatially overlapping the set of input radiation fields of the second logic gate input with the set of input radiation fields of the first logic gate input within the photochromic material, wherein a logic gate output bearing both first and second wavelengths is generated only when the two sets of radiation fields of both logic gate inputs each produce a periodic intensity grating in the photochromic material, and thereby generate the output which is phase-matched with the two sets of radiation fields of both logic gate inputs.

38. The method of claim 37, wherein the two sets of three input radiation fields each comprise first and second input radiation fields and a probe input radiation field, and wherein the logic gate output counter-propagates along the same optical path as the two probe fields.

39. The method of claim 37, wherein the photochromic material is bacteriorhodopsin or a bacteriorhodopsin analog.

40. The method of claim 37, wherein a saturation intensity level of the photochromic material, and intensity levels of the logic gate inputs, are selected such that the photochromic material is above the saturation intensity level when either of the two logic gate inputs are on, and is below the saturation intensity level when both logic gate inputs are on simultaneously, thereby enabling the two sets of radiation fields of both logic gate inputs to each produce a periodic intensity grating in the photochromic material and generate the logic gate output only when both logic gate inputs are on, wherein said logic gate output is that of an AND gate.

41. The method of claim 37, wherein a saturation intensity level of the photochromic material, and intensity levels of the logic gate inputs, are selected such that the photochromic material is below the saturation level when either of the two logic gate inputs are on individually, and when both logic gate inputs are on simultaneously, thereby enabling the two sets of radiation fields of both logic gate inputs to each produce a periodic intensity grating in the photochromic material and generate the logic gate output when either or both logic gate inputs are on, wherein said logic gate output is that of an OR gate.

* * * * *

UNITED STATES PATENT AND TRADEMARK OFFICE
CERTIFICATE OF CORRECTION

PATENT NO.    : 5,757,525
DATED         : May 26, 1998
INVENTOR(S)   : Rao et al.

It is certified that error appears in the above-identified patent and that said Letters Patent is hereby corrected as shown below:

<u>Title page,</u>
Item [73], please add -- Government of the United States/Department of the Army -- after "University of Massachusetts and"

<u>Column 1,</u>
Line 6, please insert before the BACKGROUND OF THE INVENTION, -- The invention was made with Government support under a contract awarded by the U.S. Army Soldier Systems Center, Natick, MA 01760. The Government has certain rights in the invention. --

Signed and Sealed this

Twenty-sixth Day of August, 2003

JAMES E. ROGAN
*Director of the United States Patent and Trademark Office*